United States Patent [19]

Kinoshita

[11] 4,138,068
[45] Feb. 6, 1979

[54] METHOD AND DEVICE FOR DRAWING A ROLLED PHOTOGRAPHIC FILM'S END OUT OF ITS CARTRIDGE

[76] Inventor: Yoshihiko Kinoshita, 407-3, Mozuyugumocho 2-cho, Sakai, Osaka, Japan, 590

[21] Appl. No.: 828,489

[22] Filed: Aug. 29, 1977

[30] Foreign Application Priority Data

Sep. 1, 1976 [JP] Japan .................. 51/105359
Apr. 11, 1977 [JP] Japan .................. 52/54609

[51] Int. Cl.² .................... G03B 1/02; B25B 9/00
[52] U.S. Cl. .................... 242/1; 81/3 R; 226/92; 242/55; 242/71.1
[58] Field of Search ............ 242/55, 71.1, 1, 195; 81/3 R; 226/92

[56] References Cited

U.S. PATENT DOCUMENTS

| | | | |
|---|---|---|---|
| 3,261,237 | 7/1966 | Sentiff | 81/3 R |
| 3,724,776 | 4/1973 | McKee | 242/195 |
| 3,724,777 | 4/1973 | Martin et al. | 242/195 |
| 3,838,833 | 10/1974 | Hopfner et al. | 242/195 |
| 4,047,653 | 9/1977 | Starr | 81/3 R |

*Primary Examiner*—George F. Mautz
*Attorney, Agent, or Firm*—Olson, Trexler, Wolters, Bushnell & Fosse, Ltd.

[57] ABSTRACT

This invention provides a method for drawing a rolled film's end out of its cartridge by inserting a film drawing member into the cartridge, said member being formed of a resilient steel sheet and provided with a hook on one side of said member for catching the roll of film by the selected one of its perforations within the cartridge, and then drawing said member together with one end of the roll of film out of the cartridge, and also provides a device including said member and means for operating said member.

12 Claims, 13 Drawing Figures

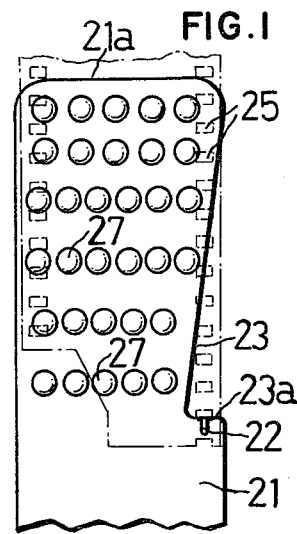
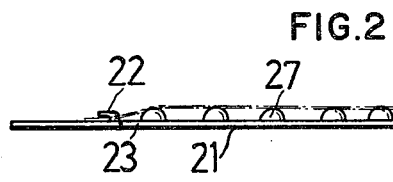
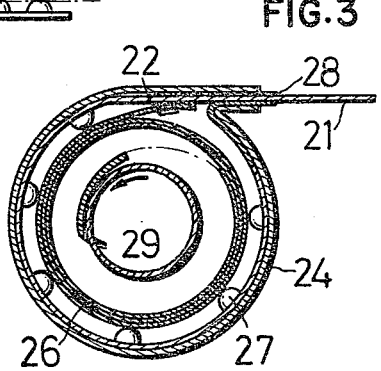
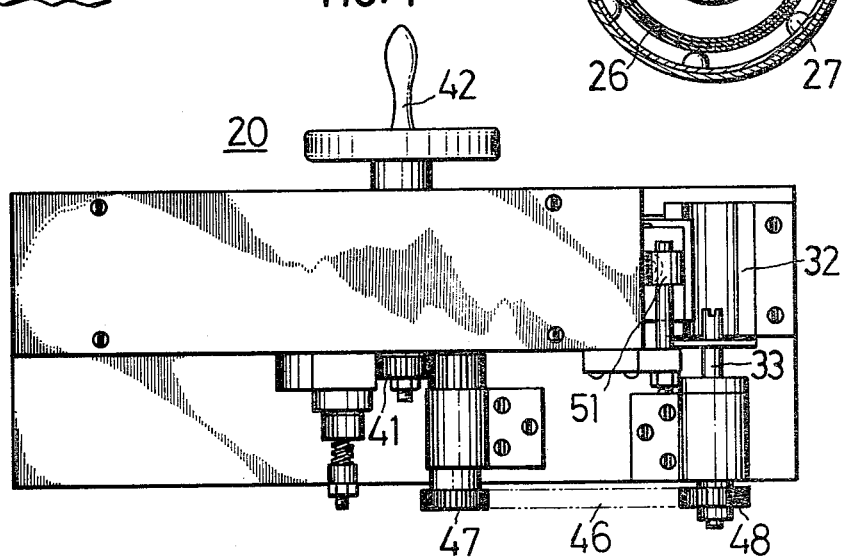
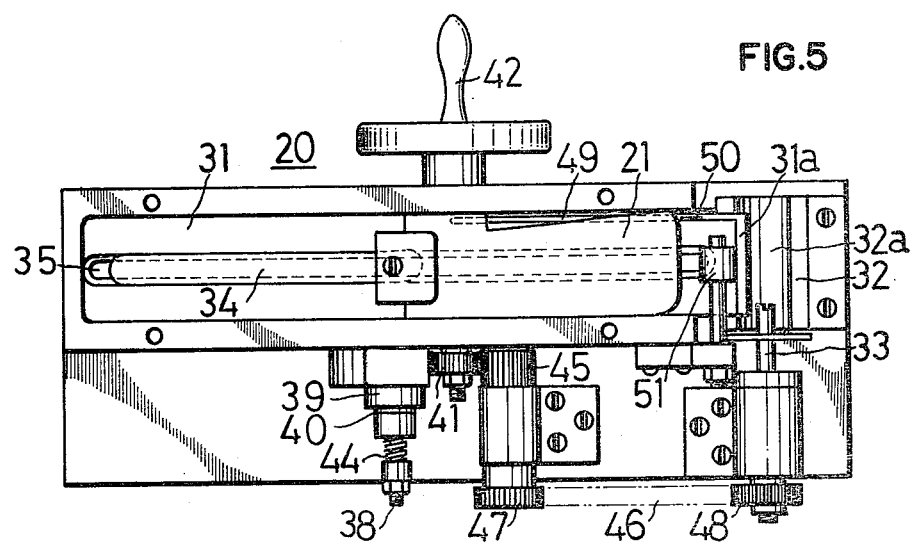

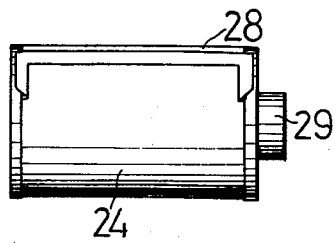
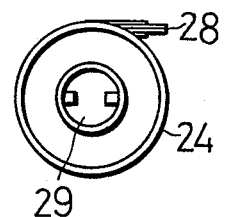
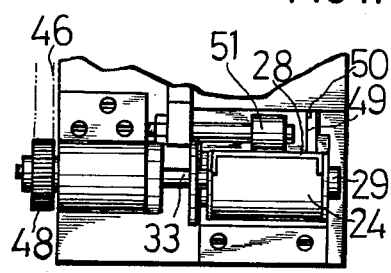
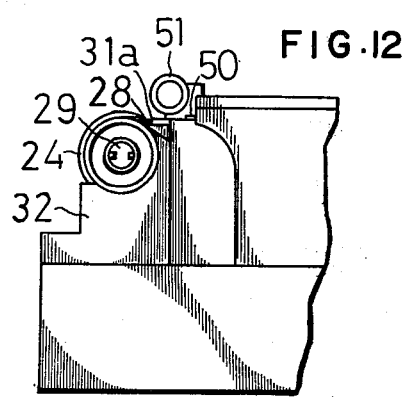
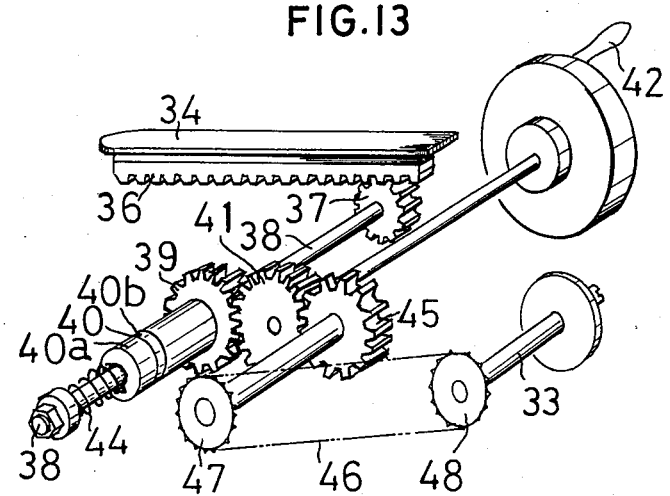

METHOD AND DEVICE FOR DRAWING A ROLLED PHOTOGRAPHIC FILM'S END OUT OF ITS CARTRIDGE

This invention relates to a method and a device for drawing one end of a roll of film having images photographed thereon out of its cartridge.

In order to develop a roll of film which has images photographed thereon and has been wound up to disappear into its cartridge, first of all, it is necessary to draw a little one end of the roll of film out of its cartridge to be processed to a developing means. In case of a monochromatic film, the development of the roll of film is performed by removing the cover of the cartridge, pulling slightly one end of the roll of film out of the cartridge and then reinstating the cover within a dark room filled with infrared rays. Since such operation is performed under observation with the naked eye, the operation can be easily performed and there is less possibility of failure.

However, in case of a color film, since the developing operation has to be performed by fumbling in a perfectly dark room or camera, such film drawing operation requires a clever-fingered and quick-witted skilled hand. And by even such a skilled hand, since the operation is a manual operation, it is unavoidable that there is a considerable limit in the number of rolls of film treated per unit time, as a result the operation is not efficient. Even a worker with 10 years of experience can usually treat only two or three rolls of film per minute, and there is the possibility that a portion of the roll of film's end is exposed to light.

The present invention has aimed to provide a novel method and device which can effectively eliminate the above mentioned disadvantages and make it possible to draw a rolled film's end out of its cartridge simply and rapidly without requiring any dark room, camera or skilled hand.

In carrying out of the above stated aim, this invention is to provice a novel method for drawing a rolled film's end out of its cartridge by inserting a film drawing member into the cartridge, said film drawing member being formed of a resilient steel sheet or the like having a width substantially corresponding to the width of the roll of film and being provided with a hook on one side on the major surface of said member, and then carrying on the insertion with the major surface of said member facing the core of the cartridge until said hook engages a selected one of the film feeding perforations in the sides of the roll of film within the cartridge, and then further drawing said member together with the trailing end of the roll of film out of the cartridge.

Another object of this invention is to provide a novel device for drawing one end of the roll of film out of its cartridge including a film drawing member formed of a resilient steel sheet on the like having a width substantially corresponding to the width of the roll of film and provided with a hook on one side on the major surface of said member for engagement with a selected one of the film feeding perforations.

Still another object of this invention is to provide a novel device including a film drawing member of the character immediately above described, and in addition, provided with a plurality of projections at an area extending on the major surface of said member. These projections, when said film drawing member is insterted into the cartridge, act to urge the outermost turn of the roll of film inwardly and thereby to roll it up more firmly so that the trailing end of the roll of film warps outwardly more resiliently and engage more easily said hook of said member by the selected one of the perforations in the roll of film.

Yet another object of this invention is to provide a novel device for drawing a rolled film's end out of its cartridge including the above described film drawing member, and in addition, including an operation platform, a cartridge holder for holding the cartridge so that the entrance and exit opening thereof is positioned just in front of said platform and the core of the cartridge is mounted on a rotary shaft of said holder, means for moving said film drawing member on said platform into and out of the cartridge by means of a slider to which said film drawing member is secured, and means for interlocking said slider with driving means and with said rotary shaft of said holder.

Another object of this invention is to provide a novel mehtod as set above, and in addition, by cutting off the connection area between the selected one of the perforations and the adjacent one brought out previously thereto in the roll of film soon after the step of drawing the tailing end of the roll of film out of its cartridge is completed, whereby said hook can be released from its engagement with the selected one of the perforations.

A further object of this invention is to provide a novel device as described forth, and in addition, including a perforation cutting blade at a predetermined position in the hook protection groove on said operation platform.

Yet another object of this invention is to provide a novel method as characterized above, and in addition, by rotating the roll of film about the core thereof within the cartridge in the direction of winding up the roll of film during the step of inserting said film drawing member into the cartridge and thereafter a while before the step of drawing said member out of the cartridge, whereby said film drawing member can be inserted smoothly into the cartridge and be positioned just outside of the outermost turn of the roll of film and said hook can easily catch a selected one of the perforations in the roll of film.

With the above and other objects in view that will hereinafter appear, the nature of the invention will be more clearly understood by reference to the following detailed description, the appended claims and the several views illustrated in the accompanying drawings.

In the drawings:

FIG. 1 is a plan view of a film drawing member, partly broken away, employed in one embodiment of the device according to this invention, illustrating the drawn-out film in a chain line.

FIG. 2 is a side elevational view of said film drawing member.

FIG. 3 is a cross sectional view of a cartridge and said film drawing member inserted therein, illustrating the principle of this invention.

FIG. 4 is a plan view of a device constructed in accordance with this invention.

FIG. 5 is a similar view of said device with the cover of the device removed therefrom.

FIG. 9 is a front elevational view of a cartridge.

FIG. 10 is a side elevational view of the cartridge.

FIG. 11 is a plan view of the front portion of the device illustrating the cartridge mounted in the cartridge holder.

FIG. 12 is a side elevational view of the same.

FIG. 13 is a schematic view of interlocking means in the device.

Figure 6:
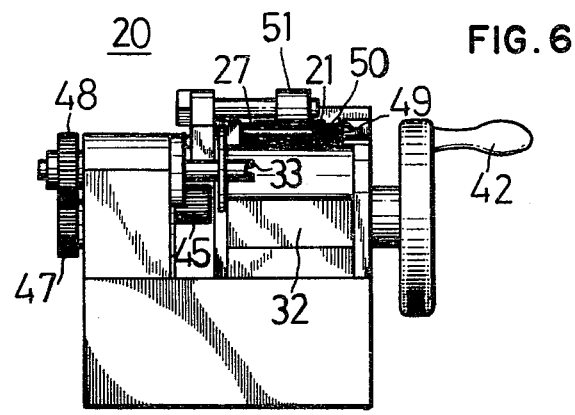
FIG. 6 is a front elevational view of said device.

The present invention will be now specially described referring to the accompanying drawings. As is best shown in FIG. 5, the device 20 includes a film drawing member 21 formed of a rectangular resilient steel sheet having a width substantially corresponding to the width of the roll of film and a thickness of about 0.1 mm.

The film drawing member 21 is provided with a substantially L-shaped hook 22 on one side at the rear on the major surface of the member 21 as best shown in FIGS. 1 and 2. The hook 22 includes an upright leg extending above the major surface of the member 21 by a height of about 0.8 mm and a pawl extending from the upper end of the upright leg toward the trailing end of the member 21.

The hook 22 may be preferably secured to the bottom 23a of a triangular notch 23 which is formed by cutting off one side of the member 21 with a length substantially corresponding to the length of the inner circumference of the cartridge 24 as measured from the leading end 21a of the member 21 and with a maximum width at the bottom 23a of the triangular notch 23 greater than the width of the side area including one side edge and a series of film feeding perforations 25 in the roll of film 26.

The film drawing member 21 is further provided with a series of round-pointed projections 27 on the major surface thereof by a height of about 0.9 mm at an area extending from the leading and 21a of the member 21 rearwardly to the extension line of the bottom 23a of the notch 23. The projections 27 are preferably formed by pressing the material of the film drawing member 21, however, they may be formed by welding separate preformed ones to the member 21.

The device 20 also includes an operation platform 31 on which the film drawing member 21 is operated to move into and out of the cartridge 24 and a cartridge holder 32 provided with a cylindrical cartridge receiving surface 32a corresponding to the outer cylindrical surface of the cartridge 24 and adapted to position the entrance and exit slit or opening 28 of the cartridge 24 adjacent to the front 31a of the platform 31. The cartridge 24 is mounted on the holder 32 and a rotary shaft 33 of the holder is adapted to fit in the core 29 of the cartridge as best illustrated in FIGS. 11 and 12. Preferably, there may be adapted pressing weight means, by hand or removable metal weight, to hold firmly the cartridge 24 on the holder 32.

The device 20 further includes means for moving the film drawing member 21 on the platform 31 into and out of the cartridge 24 mounted on the holder 32 by means of a slider 34 to which the member 21 is secured, and means for interlocking the slider 34 with driving means and with the rotary shaft 33 of the cartridge holder 32 as best illustrated schematically in FIG. 13.

The slider 34 moves slidably along a guide groove 35 provided longitudinally on the operation platform 31 through a rack 36 secured to the lower surface of the slider 34 and a pinion 37 engageable with each other as best shown in FIGS. 5 and 13. The axis 38 of the pinion 37 is driven through an intermediate gear 39 and a clutch 40 by a drive gear 41 carried by a handle 42. The clutch 40 is constructed by a friction between a friction disc 40a rotatable with and slidable on the axis 38 of the pinion 37 and another friction disc 40b rotatable with the intermediate gear 39 supported by the bearing 43. The friction clutch 40 is released from its engagement when the axial torque exceeds a predetermined friction force. When the slider 34 comes up to each limited end of the guide groove 35, the axis 38 of the pinion 37 comes into no rotation and the friction clutch 40 gets loose. Then, the intermediate gear 39 turns idle even when the handle 42 turns.

The predetermined friction force of the clutch means 40 is adjustable by control of the pressure of a coiled spring 44 adapted to urge the friction disc 40a to engage with the other friction disc 40b.

Figure 7:
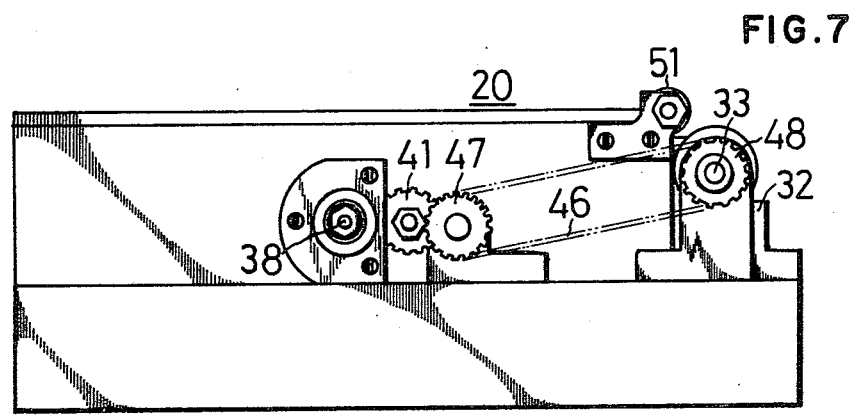
FIG. 7 is a left side elevational view of said device.
Figure 8:
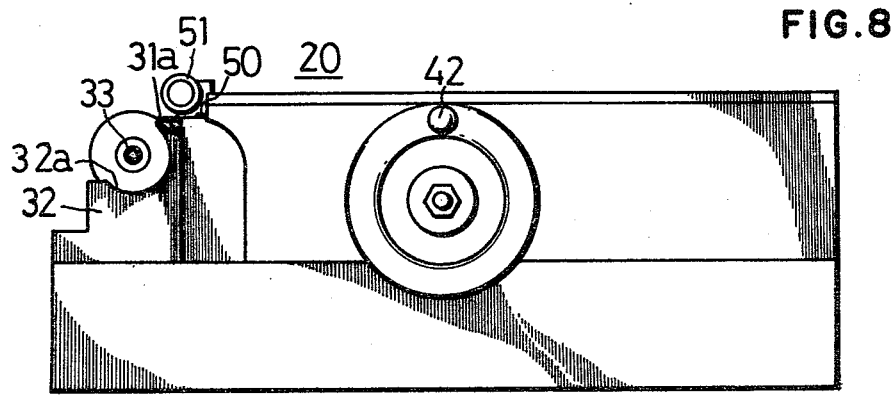
FIG. 8 is a right side elevational view of said device.

As is best understood in FIGS. 5 and 7, the drive gear 41 is also interlocked with the rotary shaft 33 of the cartridge holder 32 through a chain sprocket mechanism comprising a driven gear 45 engageable with the drive gear 41 and an interlocking chain 46 between a primary sprocket wheel 47 coaxial with the driven gear 45 and a secondary sprocket wheel 48 rotatable with the rotary shaft 33.

There may be also preferably provided a clutch (not illustrated) between the rotary shaft 33 and the secondary sprocket wheel 48, whereby to idle away the handle 42 and the chain sprocket means when the roll of film 26 is over wound up to cause the selected one of the perforations to be torn by hook 22 within the cartridge upon the insertion of the film drawing member 21.

Thus, the slider 34, in supporting the film drawing member 21 up the rear, is driven forwardly and backwardly by the turn of the handle 42 and is interlocked with the rotary shaft 33 of the cartridge holder 32.

The film drawing member 21 secured to the leading end of the slider 34 is set slidably with the major surface thereof onto the operation platform 31. The hook 22 and projections 27 of the member 21 therefore slide on the platform 31, however, the hook 22 should be preferably guided by a hook projection groove 49.

There is provided a perforation cutting blade 50 projecting upright at a suitable position in the hook protection groove 49 in the platform 31 for cutting off the connection area in the roll of film between the selected one of the perforations 25 caught by the hook 22 and the adjacent one brought out previously thereto.

A roller 51 may be preferably adapted to push the film drawing member 21 onto the operation platform 31 at a place adjacent to the front 31a thereof so that the leading end 21a of the member 21 may be just directed into the opening 28 of the cartridge 24.

Any suitable electric motor and electronic circuit may be, of course, employed to replace the manually driven handle 42 and to drive automatically the interlocking means.

In operation of the device 20, the cartridge 24 in which the film with images photographed thereon has been rolled up is mounted on the holder 32 and the core 29 of the cartridge 24 is fitted to the rotary shaft 33 so that the entrance and exit opening 28 of the cartridge 24 is positioned in front of the operation platform 31.

The turn of the handle 42 drives the slider 34 forward, thereby the film drawing member 21 also moves forward. The leading end 21a of the member 21 passes under the roller 51 into the cartridge 24 at the opening 28 thereof and advances around in the cartridge 24 along the inner wall thereof inwardly by a predetermined distance. The film drawing member 21 is inserted into the cartridge 24 in such a manner that the major surface of the member 21 on which the hook 22 and projections 27 are provided faces the axial core 24 within the cartridge 24. The hook 22 consequently comes to a position inside of the cartridge 24 adjacent to the opening slit 28.

During the inserting step, the rotary shaft is driven and the film supporting core 29 of the cartridge 24 rotates in the direction of wind up of the roll of film 26, namely, in the arrow direction as seen in FIG. 3. Whereby, even when the roll of film 26 has been loosely wound about the core 29, the film drawing member 21 is always inserted outside of the outermost turn of the roll of film 26 in the cartridge 24. The rotation of the core 29 is carried on thereafter a while. Thus, the trailing end of the roll of film 26 warps outwardly at a position inside of the cartridge 24 adjacent to the opening slit 28 and is caught by the hook 22 by the selected one of the perforations 25.

Then, the handle 42 is reversed so as to pull the film drawing member 21 out of the cartridge 24. Thereby, the trailing end of the roll of film 26 goes out together with the member 21. The drawn-out end of the roll of film 26 is a little further pulled to the position of the perforation cutting blade 50 where the connection area between the selected one of the perforation and its adjacent one is cut off so that the hook 22 is at once released from the film. Whereupon, the drawing-out operation of the roll of film's end terminates and the cartridge 24 is removed from the holder 32.

From the foregoing, it will be understood that other variations may be made in the device disclosed herein without departing from the spirit and scope of the invention as defined in the appended claims.

I claim:

1. A method for drawing a conventional, perforated side edge-type rolled photographic film's trailing end out of its cartridge including the steps of: inserting a film drawing member into the cartridge, said film drawing member being formed of a resilient steel sheet or the like having a film-facing surface of width substantially corresponding to the width of the roll of film and being provided with projection means and with a hook on the film-facing surface of said member, carrying on the insertion with the film-facing surface of said member substantially surrounding an outer layer of film in the cartridge, the projection means compressing the outer layer of film and warping the trailing end of the film radially outwardly until said hook engages a selected one of the film feeding perforations in the side edges of the leading end of the roll of film within the cartridge, and then drawing said member together with the trailing end of the roll of flim out of the cartridge.

2. A method as set forth in claim 1, further including rotating the roll of film about the film supporting core thereof within the cartridge in the direction of winding up the roll of film during the step of inserting said film drawing member into the cartridge and thereafter a while before the step of drawing said member out of the cartridge, whereby said film drawing member can be inserted smoothly into the cartridge and be reliably positioned just outside of said outer layer of the roll of film and said hook of said member can easily catch a selected one of the side edge perforations in the roll of film.

3. A method as set forth in claim 2, further including cutting off the connection area between the selected one of the perforations caught by said hook and the adjacent one brought out previously thereto in the roll of film soon after the step of drawing the trailing end of the roll of film out of the cartridge is completed, whereby said hook can be released from its engagement with the selected one of the perforations.

4. A device for drawing a conventional, perforated side edge-type rolled photographic film's leading end out of its cartridge including a flexible film drawing member formed of a resilient steel sheet or the like having a film facing surface of width substantially corresponding to the width of the roll of film and provided with projection means and with a hook on the film facing surface of said member, said projection means compressing the film to warp the leading end radially outwardly as the film facing surface surrounds the rolled film for engagement of the hook with a selected one of the film feeding side edge perforations in the leading end of the roll of film.

5. A device as set forth in claim 4, wherein said hook is secured to the bottom of a triangular notch which is formed by cutting off one side of said member with a length substantially corresponding to the length of the inner circumference of the cartridge as measured from the leading end of said member and with a maximum width at the bottom of said notch greater than the width of the side area including one side edge and a series of the perforations in the roll of film so as to accommodate said warping of said leading film end for engagement of a perforation with said hook.

6. A device as set forth in claim 5, wherein said hook includes an upright leg extending above the major surface of said member by a predetermined height and a pawl extending from the upper end of the upright leg toward the trailing end of said member.

7. A device as set forth in claim 6, wherein said projections are provided at an area extending on the major surface from the leading end rearwardly to the extension line of the bottom of the notch of said member.

8. A device for drawing a perforated edge, rolled photographic film's end out of its cartridge including a film drawing member formed of a resilient steel sheet or the like having a film facing surface of width substantially corresponding to the width of the roll of film and provided with a hook on the film facing surface of said member and disposed for catching a selected one of the edge perforations when inserted into the cartridge, an operation platform mounting said film drawing member, a cartridge holder for holding the cartridge so that the entrance and exit opening thereof is positioned just in front of said platform and having a rotary shaft, the core of the cartridge being mounted on the rotary shaft of said holder, means for moving said film drawing member on said platform into and out of the cartridge including a slider to which said film drawing member is secured, driving means for driving said slider and means interlocking said driving means for driving said rotary shaft of said holder.

9. A device as set forth in claim 8, wherein said slider travels along a longitudinal guide groove on said platform, a rack is secured to the lower surface of said slider and a pinion is engageable with the rack and operable by said driving means.

10. A device as set forth in claim 9, wherein said interlocking means include a friction clutch operable and adjustable by the pressure of a spring.

11. A device as set forth in claim 8, wherein a perforation cutting blade is provided, disposed at a suitable position with respect to said hook to cut off the connection area between the selected one of the perforations caught by said hook and the preceding adjacent perforation in the drawn-out film.

12. A device as set forth in claim 8, wherein a roller is provided to urge said film drawing member toward said platform at a place adjacent to the front thereof so that the leading end of said member may be just directed into the opening of the cartridge.

* * * * *